(12) United States Patent
Bradfield

(10) Patent No.: US 8,395,287 B2
(45) Date of Patent: Mar. 12, 2013

(54) COOLANT CHANNELS FOR ELECTRIC MACHINE STATOR

(75) Inventor: Michael D. Bradfield, Anderson, IN (US)

(73) Assignee: Remy Technologies, LLC, Pendleton, IN (US)

( * ) Notice: Subject to any disclaimer, the term of this patent is extended or adjusted under 35 U.S.C. 154(b) by 141 days.

(21) Appl. No.: 12/897,663

(22) Filed: Oct. 4, 2010

(65) Prior Publication Data

US 2012/0080964 A1     Apr. 5, 2012

(51) Int. Cl.
*H02K 9/00* (2006.01)
(52) U.S. Cl. .............................. 310/58; 310/52
(58) Field of Classification Search ............ 310/52, 310/54, 58, 64
See application file for complete search history.

(56) References Cited

U.S. PATENT DOCUMENTS

| | | | |
|---|---|---|---|
| 2,080,678 A | 5/1937 | Van Horn et al. | |
| 2,264,616 A | 12/1941 | Buckbee | |
| 3,447,002 A | 5/1969 | Ronnevig | |
| 3,525,001 A | 8/1970 | Erickson | |
| 3,748,507 A | 7/1973 | Sieber | |
| 4,038,570 A | 7/1977 | Durley, III | |
| 5,081,382 A | 1/1992 | Collings et al. | |
| 5,180,004 A | 1/1993 | Nguyen | |
| 5,207,121 A | 5/1993 | Bien | |
| 5,293,089 A | 3/1994 | Frister | |
| 5,372,213 A | 12/1994 | Hasebe et al. | |
| 5,491,371 A * | 2/1996 | Ooi .............................. | 310/58 |
| 5,519,269 A | 5/1996 | Lindberg | |
| 5,616,973 A | 4/1997 | Khazanov | |
| 5,859,482 A | 1/1999 | Crowell et al. | |
| 5,923,108 A | 7/1999 | Matake et al. | |
| 5,937,817 A | 8/1999 | Schanz et al. | |
| 5,965,965 A | 10/1999 | Umeda et al. | |
| 6,011,332 A | 1/2000 | Umeda et al. | |
| 6,069,424 A | 5/2000 | Colello et al. | |
| 6,075,304 A | 6/2000 | Nakatuska | |
| 6,087,746 A | 7/2000 | Couvert | |
| 6,095,754 A | 8/2000 | Ono | |
| 6,097,130 A | 8/2000 | Umeda et al. | |
| 6,114,784 A | 9/2000 | Nakano | |

(Continued)

FOREIGN PATENT DOCUMENTS

EP     2058926 A2    5/2009
JP     05-103445 A   4/1993

(Continued)

OTHER PUBLICATIONS

International Search Report, Received Jul. 31, 2012.

(Continued)

*Primary Examiner* — Nguyen N Hanh
(74) *Attorney, Agent, or Firm* — Greenberg Traurig LLP

(57) ABSTRACT

Embodiments of the invention provide an electric machine module including an electric machine. The electric machine includes a stator assembly with a plurality of stator laminations. The plurality of stator laminations include a plurality of different outer diameters and some of the plurality of stator laminations include at least two different radii. At least one circumferential coolant channel and at least one axial coolant channel can be defined by the plurality of stator laminations. The at least one circumferential coolant channel can be defined substantially around a circumference of the stator assembly and the at least one axial coolant channel can be defined substantially along an axial length of the stator assembly.

17 Claims, 3 Drawing Sheets

U.S. PATENT DOCUMENTS

| | | |
|---|---|---|
| 6,147,430 A | 11/2000 | Kusase et al. |
| 6,147,432 A | 11/2000 | Kusase et al. |
| 6,173,758 B1 | 1/2001 | Ward et al. |
| 6,181,043 B1 | 1/2001 | Kusase et al. |
| 6,201,321 B1 | 3/2001 | Mosciatti |
| 6,208,060 B1 | 3/2001 | Kusase et al. |
| 6,232,687 B1 | 5/2001 | Hollenbeck et al. |
| 6,242,836 B1 | 6/2001 | Ishida et al. |
| 6,291,918 B1 | 9/2001 | Umeda et al. |
| 6,300,693 B1 | 10/2001 | Poag et al. |
| 6,313,559 B1 | 11/2001 | Kusase et al. |
| 6,333,573 B1 | 12/2001 | Nakamura |
| 6,335,583 B1 | 1/2002 | Kusase et al. |
| 6,346,758 B1 | 2/2002 | Nakamura |
| 6,359,232 B1 | 3/2002 | Markovitz et al. |
| 6,404,628 B1 | 6/2002 | Nagashima et al. |
| 6,417,592 B2 | 7/2002 | Nakamura et al. |
| 6,459,177 B1 | 10/2002 | Nakamura et al. |
| 6,509,665 B1 | 1/2003 | Nishiyama et al. |
| 6,515,392 B2 | 2/2003 | Ooiwa |
| 6,522,043 B2 | 2/2003 | Measegi |
| 6,559,572 B2 | 5/2003 | Nakamura |
| 6,579,202 B2 | 6/2003 | El-Antably et al. |
| 6,770,999 B2 | 8/2004 | Sakuraki |
| 6,897,594 B2 | 5/2005 | Ichikawa et al. |
| 6,903,471 B2 | 6/2005 | Arimitsu et al. |
| 6,998,749 B2 | 2/2006 | Wada et al. |
| 7,002,267 B2 | 2/2006 | Raszkowski et al. |
| 7,009,317 B2 * | 3/2006 | Cronin et al. .............. 310/54 |
| 7,239,055 B2 | 7/2007 | Burgman et al. |
| 7,276,006 B2 | 10/2007 | Reed et al. |
| 7,284,313 B2 | 10/2007 | Raszkowski et al. |
| 7,339,300 B2 | 3/2008 | Burgman et al. |
| 7,352,091 B2 | 4/2008 | Bradfield |
| 7,402,923 B2 | 7/2008 | Klemen et al. |
| 7,417,344 B2 | 8/2008 | Bradfield |
| 7,508,100 B2 | 3/2009 | Foster |
| 7,538,457 B2 | 5/2009 | Holmes et al. |
| 7,545,060 B2 | 6/2009 | Ward |
| 7,592,045 B2 | 9/2009 | Smith et al. |
| 7,615,903 B2 | 11/2009 | Holmes et al. |
| 7,615,951 B2 | 11/2009 | Son et al. |
| 7,667,359 B2 | 2/2010 | Lee et al. |
| 7,939,975 B2 | 5/2011 | Saga et al. |
| 2003/0222519 A1 | 12/2003 | Bostwick |
| 2004/0036367 A1 | 2/2004 | Denton et al. |
| 2004/0189110 A1 | 9/2004 | Ide et al. |
| 2004/0195929 A1 | 10/2004 | Oshidari |
| 2005/0023266 A1 | 2/2005 | Ueno et al. |
| 2005/0023909 A1 | 2/2005 | Cromas |
| 2005/0194551 A1 | 9/2005 | Klaussner et al. |
| 2005/0274450 A1 | 12/2005 | Smith et al. |
| 2005/0285456 A1 | 12/2005 | Amagi et al. |
| 2007/0013241 A1 * | 1/2007 | Schiferl et al. ............. 310/54 |
| 2007/0024130 A1 | 2/2007 | Schmidt |
| 2007/0052313 A1 | 3/2007 | Takahashi |
| 2007/0063607 A1 | 3/2007 | Hattori |
| 2007/0145836 A1 | 6/2007 | Bostwick |
| 2007/0149073 A1 | 6/2007 | Klaussner et al. |
| 2007/0216236 A1 | 9/2007 | Ward |
| 2008/0223557 A1 | 9/2008 | Fulton et al. |
| 2009/0121564 A1 * | 5/2009 | Pal et al. .................. 310/58 |
| 2009/0174278 A1 | 7/2009 | Sheaffer et al. |
| 2010/0026111 A1 | 2/2010 | Monzel |
| 2010/0102649 A1 | 4/2010 | Cherney et al. |
| 2010/0109454 A1 | 5/2010 | Vadillo et al. |
| 2010/0176668 A1 | 7/2010 | Murakami |
| 2011/0050141 A1 | 3/2011 | Yeh et al. |
| 2011/0101700 A1 | 5/2011 | Stiesdal |
| 2011/0109095 A1 | 5/2011 | Stiesdal |

FOREIGN PATENT DOCUMENTS

| | | |
|---|---|---|
| JP | 05-292704 A | 11/1993 |
| JP | 06-036364 U | 5/1994 |
| JP | 06-311691 A | 11/1994 |
| JP | 07-264810 A | 10/1995 |
| JP | 08-019218 A | 1/1996 |
| JP | 09-046973 A | 2/1997 |
| JP | 09-154257 A | 6/1997 |
| JP | 10-234157 A | 9/1998 |
| JP | 11-132867 A | 5/1999 |
| JP | 11-206063 A | 7/1999 |
| JP | 2000-152563 A | 5/2000 |
| JP | 2000-324757 A | 11/2000 |
| JP | 2000-333409 A | 11/2000 |
| JP | 2001-333559 A | 11/2001 |
| JP | 2002-095217 A | 3/2002 |
| JP | 2002-119019 A | 4/2002 |
| JP | 2003-299317 A | 10/2003 |
| JP | 2003-324901 A | 11/2003 |
| JP | 2004-215353 A | 7/2004 |
| JP | 2004-236376 A | 8/2004 |
| JP | 2004-248402 A | 9/2004 |
| JP | 2004-297924 A | 10/2004 |
| JP | 2004-312886 A | 11/2004 |
| JP | 2004-357472 A | 12/2004 |
| JP | 2005-012989 A | 1/2005 |
| JP | 2005-168265 A | 6/2005 |
| JP | 2006-060914 A | 3/2006 |
| JP | 2000-152561 A | 9/2006 |
| JP | 2006-297541 A | 11/2006 |
| JP | 2006-528879 A | 12/2006 |
| JP | 2007-282341 A | 10/2007 |
| JP | 2008-021950 A | 2/2008 |
| JP | 2008-206213 A | 9/2008 |
| JP | 2008-219960 A | 9/2008 |
| JP | 2008-544733 A | 12/2008 |
| JP | 2009-247084 A | 10/2009 |
| JP | 2009-254205 A | 10/2009 |
| JP | 2010-028908 A | 2/2010 |
| JP | 2010-028958 A | 2/2010 |
| JP | 2010-035265 A | 2/2010 |
| JP | 2010-063253 A | 3/2010 |
| JP | 2010-121701 A | 6/2010 |
| JP | 2010-154678 A | 7/2010 |
| KR | 10-1997-0055103 A | 7/1997 |
| KR | 10-2000-0013908 A | 3/2000 |
| KR | 10-2006-0102496 A | 9/2006 |
| KR | 10-2007-0027809 A | 3/2007 |
| KR | 10-2009-0048028 A | 5/2009 |

OTHER PUBLICATIONS

International Search Report completed Apr. 9, 2012.
International Search Report, Received Jan. 9, 2012.
International Search Report, Received Feb. 16, 2012.
International Search Report, Received Dec. 22, 2011.
International Search Report, Received Dec. 5, 2011.
International Search Report, Received Dec. 27, 2011.
International Search Report completed Apr. 19, 2012.
International Search Report completed Apr. 20, 2012.
International Search Report completed Mar. 7, 2012.
International Search Report completed Apr. 24, 2012.

* cited by examiner

COOLANT CHANNELS FOR ELECTRIC MACHINE STATOR

BACKGROUND

Electric machines, often contained within a housing, are generally comprised of a stator assembly and a rotor. During operation of electric machines, a considerable amount of heat energy can by generated by both the stator assembly and the rotor, as well as other components of the electric machine. Conventional cooling methods include removing the generated heat energy by forced convection to a jacket filled with a coolant. The coolant jacket is often contained within or outside walls of the housing.

SUMMARY

Some embodiments of the invention provide an electric machine module including an electric machine with a stator assembly. The stator assembly can include a first set of stator laminations with at least a portion having a first outer diameter and a second set of stator laminations with at least a portion having a second outer diameter larger than the first outer diameter. At least some of the second set of stator laminations each include first radial portions having a first radius and second radial portions having a second radius smaller than the first radius. The first radial portions and the second radial portions are staggered between one another. The electric machine module can also include at least one circumferential coolant channel defined substantially around a circumference of the stator assembly by the first set of stator laminations and the second set of stator laminations, and at least one axial coolant channel defined substantially along an axial length of the stator assembly by the first set of stator laminations and the second set of stator laminations.

Some embodiments of the invention provide an electric machine module comprising an electric machine with a stator assembly. The stator assembly includes a plurality of stator laminations and the plurality of stator laminations include a plurality of different outer diameters. A portion of the plurality of stator laminations each include at least two different radii. The electric machine module also includes at least one circumferential coolant channel and at least one axial coolant channel defined by the plurality of stator laminations. The at least one circumferential coolant channel can be defined substantially around a circumference of the stator assembly and the at least one axial coolant channel can be defined substantially along an axial length of the stator assembly. The electric machine module further includes a housing including an inner wall, a sleeve member and at least one end cap coupled to the sleeve member. The housing substantially circumscribes the electric machine, and the sleeve member and the at least one end cap at least partially define a machine cavity.

Some embodiments of the invention provide a method to cool an electric machine module. The method can include providing an electric machine with stator assembly including a plurality of stator laminations. The plurality of stator laminations include a plurality of different outer diameters and a portion of the plurality of stator laminations include at least two different radii. The method can also include positioning the plurality of stator laminations relative to each other to form at least one circumferential coolant channel substantially around a circumference of the stator assembly and at least one axial coolant channel substantially along an axial length of the stator assembly and providing a housing substantially circumscribing the electric machine. The housing includes an inlet port in fluid communication with the at least one circumferential coolant channel and the at least one axial coolant channel. The method can further include introducing a coolant through the inlet port and circulating the coolant through the at least one circumferential coolant channel and the at least one axial coolant channel to cool the electric machine.

DETAILED DESCRIPTION

Figure 1:
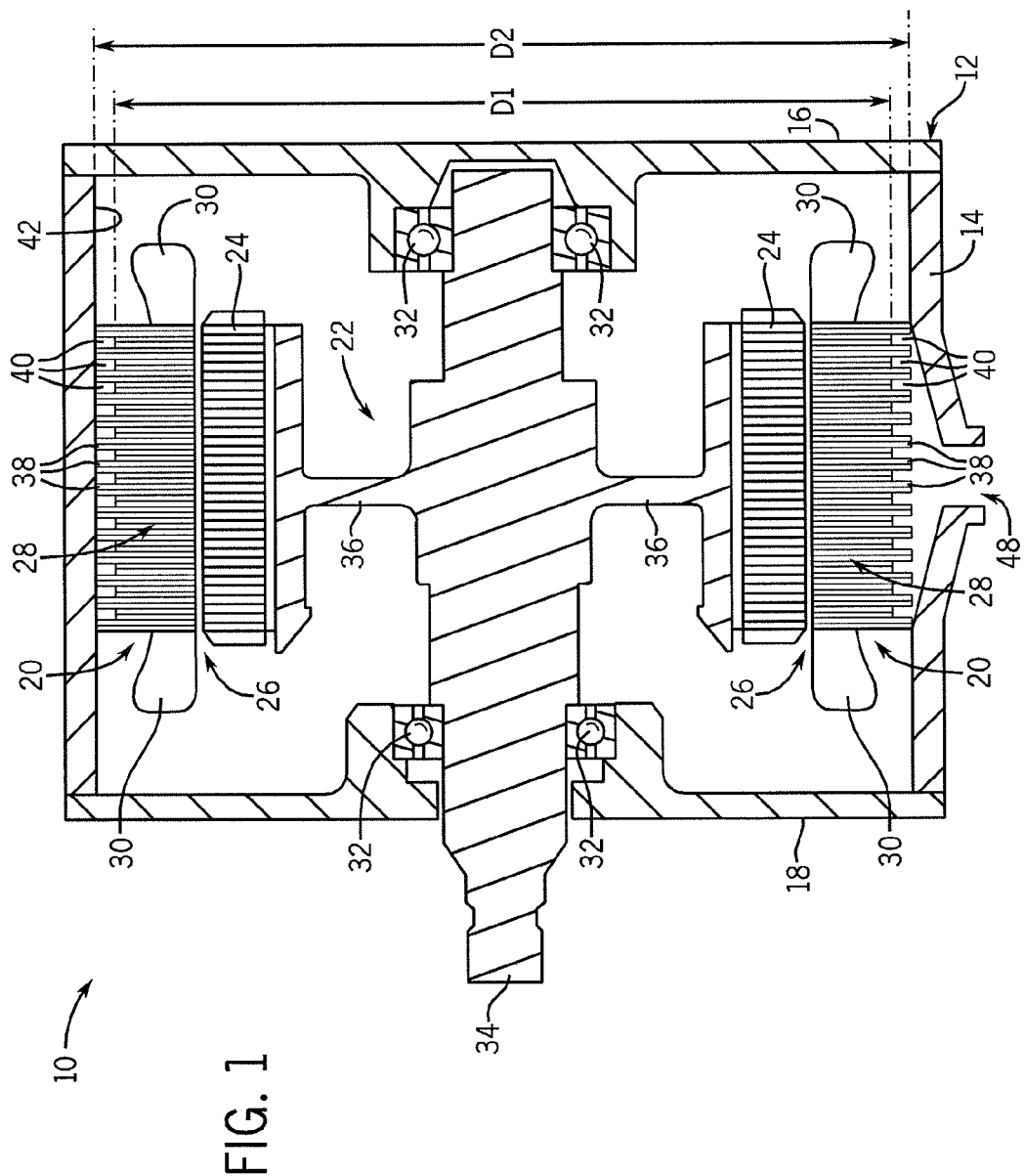
FIG. 1 is a front cross-sectional view of an electric machine module according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates an electric machine module 10 according to one embodiment of the invention. The electric machine module 10 can include a housing 12 comprising a sleeve member 14, a first end cap 16, and a second end cap 18. An electric machine 20 can be housed within a machine cavity 22 at least partially defined by the sleeve member 14 and the end caps 16, 18. For example, the sleeve member 14 and the end caps 16, 18 can be coupled via fasteners (not shown), or another suitable coupling manner, to enclose the electric machine 20 within the machine cavity 22. Also, the housing 12 can at least partially circumscribe the electric machine 20. In other embodiments, the housing 12 can comprise a substantially enclosed, substantially cylindrical canister and a single end cap (not shown).

Figure 4A:
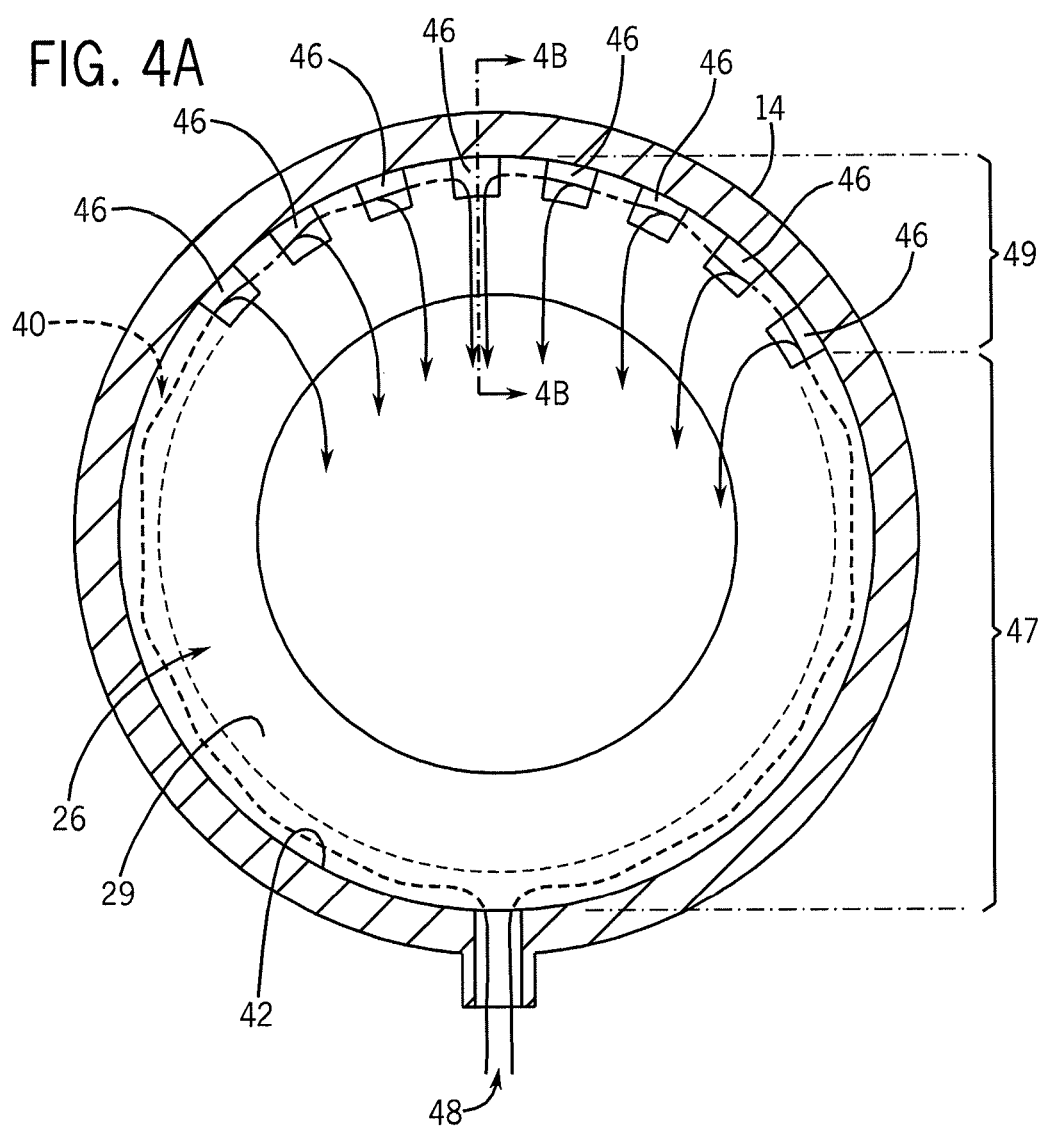
FIG. 4A is a side cross-sectional view of an electric machine module according to one embodiment of the invention.

The electric machine 20 can include a rotor 24, a stator assembly 26 comprising a plurality of stator laminations 28, stator windings 29 (as shown in FIG. 4A), and stator end turns 30, and bearings 32, and can be disposed about a main output shaft 34. As shown in FIG. 1, the stator assembly 26 can circumscribe the rotor 24. In some embodiments, the electric machine 20 can also include a rotor hub 36 or can have a "hub-less" design (not shown). The electric machine 20 can be, without limitation, an electric motor, such as a hybrid electric motor, an electric generator, or a vehicle alternator. In one embodiment, the electric machine 20 can be a High Voltage Hairpin (HVH) electric motor for use in a hybrid vehicle.

Components of the electric machine 20 such as, but not limited to, the stator assembly 26 can generate heat during operation of the electric machine 20. These components can be cooled to enhance the performance and increase the lifespan of the electric machine 20.

In some embodiments, the plurality of stator laminations 28 can create a finned outer surface of the stator assembly 26. More specifically, the plurality of stator laminations 28 can have varying, staggering, or different outer diameters, creating radially extending "fins" 38 around a circumference of the stator assembly 26, as shown in FIG. 1. For example, a first set of stator laminations 28 can include at least a portion having a first outer diameter D1, and a second set of stator laminations 28 can include at least a portion having a second outer diameter D2 larger than the first outer diameter D1, thus forming the finned outer surface. The first set and the second set can be staggered one by one, two by two, one by two, etc. to form a desired fin profile around the circumference of the stator assembly 26. In one embodiment, the second outer diameter D2 can be substantially equal to an inner diameter of the sleeve member 14 so that the second set of stator laminations 28 come in contact with the sleeve member 14, as shown in FIG. 1. A plurality of circumferential coolant channels 40 can be defined between an outer surface of the first set of stator laminations 28 and side surfaces of the second set of stator laminations 28 (i.e., between the fins 38), as shown in FIG. 1. In some embodiments, the circumferential coolant channels 40 can be further defined by an inner surface 42 of the sleeve member 14. In some embodiments, stator laminations 28 of the second set can be can be grouped substantially at axial ends of the stator assembly 26 so that one circumferential coolant channel 40 can be defined between (not shown).

Figure 2:
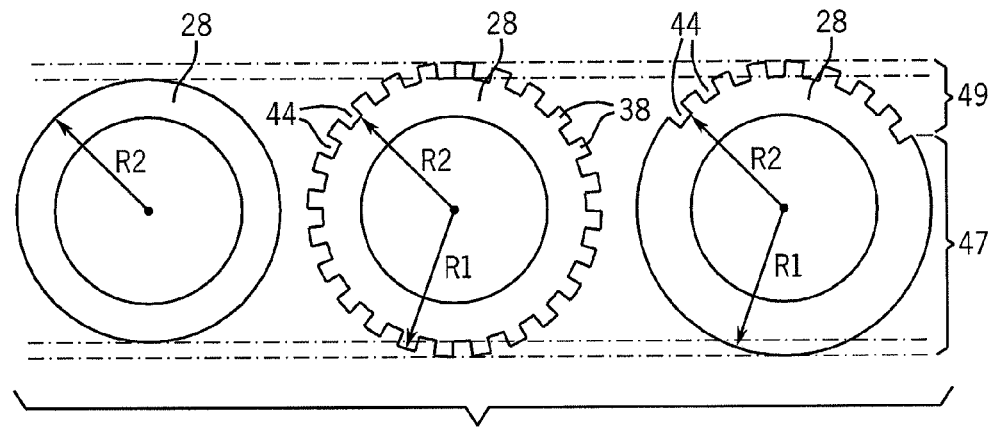
FIG. 2 is a side cross-sectional view of three different stator laminations for use with the electric machine of FIG. 1.

In addition, the second set of stator laminations can each have staggered diameters by including at least two different radii. For example, as shown in FIG. 2, the second set of stator laminations can have first radial portions with a first radius R1 and second radial portions with a second radius R2 smaller than the first radius R1. The first radial portions and the second radial portions can be staggered so that axial slots 44 can be defined along a circumference of the second set of stator laminations (i.e., through the fins 38), so that each of the second set of stator laminations can include a "toothed" outer surface. In some embodiments, the first radial portions can be of substantial radial length to come in contact with the sleeve member 14. For example, the first radial portions can be equal to about half of the second diameter D2. In addition, in some embodiments, the first set of stator laminations can have a constant radius substantially equal to the second radius R2 (e.g., about half of the first diameter D1), as shown in FIG. 2.

Figure 3:
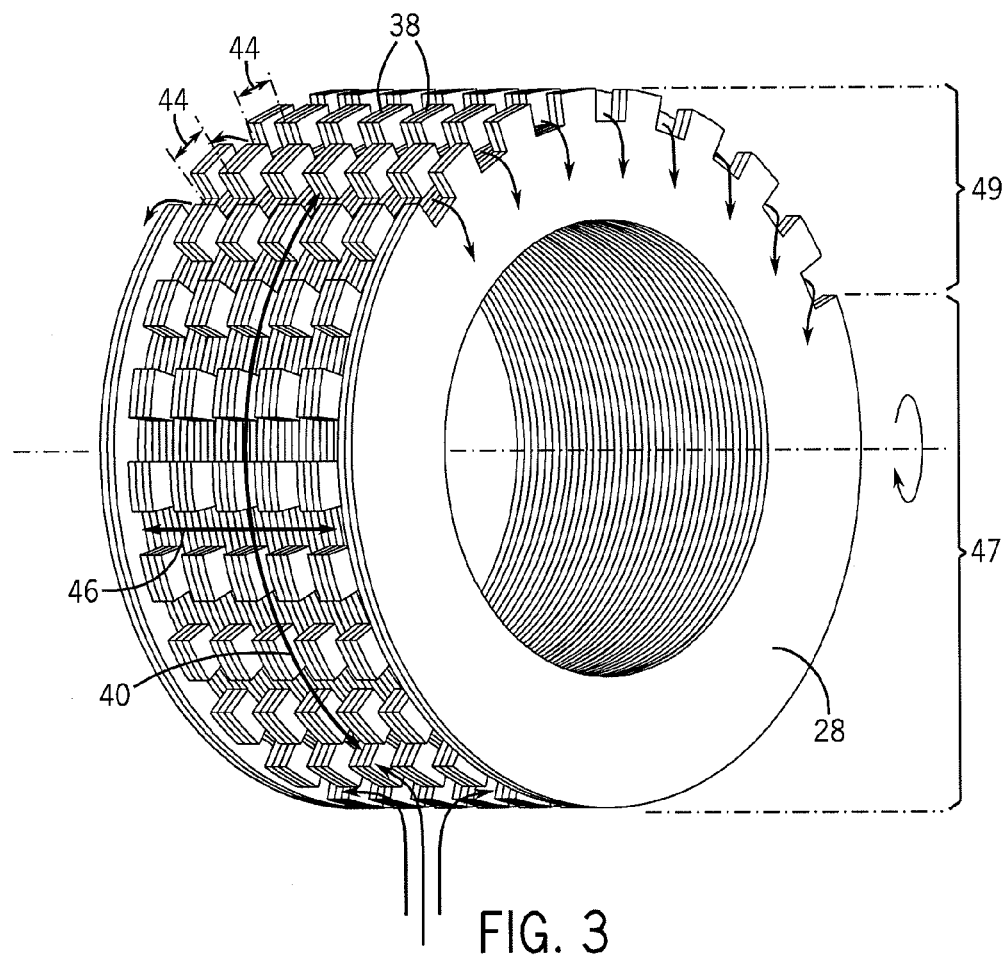
FIG. 3 is a perspective view of a stator assembly of the electric machine of FIG. 1.
Figure 4B:
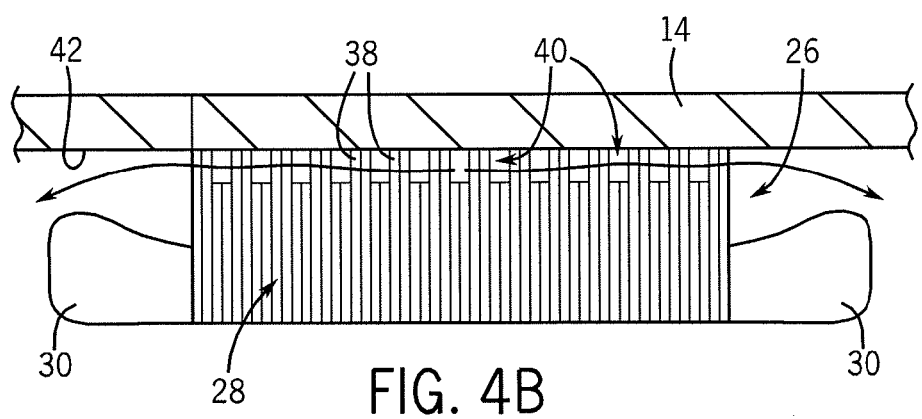
FIG. 4B is a sectional view of the electric machine module of FIG. 4A along line A-A.

A plurality of axial coolant channels 46 can be defined between an outer surface of the first set of stator laminations 28 and side surfaces of the second set of stator laminations 28 (i.e., through the axial slots 44, as shown in FIG. 3). In some embodiments, the axial coolant channels 46 can be further defined by an inner surface 42 of the sleeve member 14. Further, the axial coolant channels 46 can be defined along an axial length of the stator assembly 26. A coolant, such as water, ethylene glycol, a water/ethylene glycol mixture, oil, transmission fluid, or any similar substance, can be circulated through the circumferential coolant channels 40 and the axial coolant channels 46, as shown in FIGS. 3-4B, to help cool the stator assembly 26.

In some embodiments, the stator assembly 26 can include a third set of stator laminations 28. The third set of stator laminations 28 can be positioned at the axial ends of the stator assembly 26. As shown in FIGS. 2 and 3, the third set of stator laminations 28 can have a constant radius substantially equal to the first radius R1 along a first portion 47 of the stator assembly 26. In some embodiments, the first portion 47 of the stator assembly 26 can include at least a lower half of the stator assembly 26. The third set of stator laminations 28 also can have the first and the second radial portions (i.e., of first radius R1 and second radius R2, respectively) staggered along a second portion 49 of the stator assembly 26. In some embodiments, the second portion 49 of the stator assembly 26 can include at least some portion of an upper half of the stator assembly 26. The first and the second radial portions of the third set can define a toothed outer surface, or secondary axial slots 44, along the second portion 49.

The secondary axial slots 44 of the third set of stator laminations 28 can match, or line up with, a portion of the toothed outer surface of the second set of stator laminations 28, as shown in FIG. 3. As a result, the axial coolant channels 46 along the second portion 49 of the stator assembly 26 can be in fluid communication with the secondary axial slots 44 of the third set. As such, the axial coolant channels 46 can extend along an entire length of the stator assembly 26, and can be in fluid communication with the machine cavity 22. Along the first portion 47 of the stator assembly 26, the third set of stator laminations 28 can substantially prevent fluid communication between the axial coolant channels 46 and the machine cavity 22, thus forcing the coolant to continue flowing through the circumferential coolant channels 40 toward the second portion 49 of the stator assembly 26. In other embodiments, a single axial coolant channel 46 can be defined across an entire axial length of the stator assembly 26 along the second portion 49.

In some embodiments, the sleeve member 14 can include one or more inlet ports 48. The inlet port 48 can be in fluid communication with the coolant channels 40, 46. The coolant can be supplied to the coolant channels 40, 46 through the inlet port 48 and can be exhausted from the coolant channels 40, 46 through the axial coolant channels 46 along the second portion 49 of the stator assembly 26 into the machine cavity 22, as shown in FIGS. 3-4B. In one embodiment, the inlet port 48 be positioned along the first portion 47 of the stator assembly 26, as shown in FIG. 4A.

During operation of the electric machine 20, heat energy generated by the electric machine components can be transferred via forced convection through the stator laminations 28 to the coolant flowing through the coolant channels 40, 46. As the heat energy is transferred from the electric machine components to the coolant, the electric machine 20 is cooled and the coolant is heated. The heated coolant can be directed out of the coolant channels 40, 46 to the machine cavity 22. In some embodiments, the heated coolant directed out of the coolant channels 40, 46 can flow across the stator end turns 30 to further remove heat from the electric machine 20. The heated coolant can then pool near or at a bottom portion of the machine cavity 22. A drain (not shown) can be located at or near the bottom portion of the machine cavity to direct the pooled coolant to a heat transfer element outside the housing 12, for example, at a fluid source (not shown), for recooling. The heat transfer element can be a radiator or another suitable heat exchanger. Once the coolant is recooled, it can be recycled back to the coolant channels 40, 46 via the inlet port 48.

Conventionally, a stator assembly is inserted into a steel sleeve. An outer surface of the steel sleeve forms an inner surface of a coolant jacket, and another housing member surrounds the steel sleeve to form an outer surface of the coolant jacket. In some embodiments, the coolant channels 40, 46 can eliminate the need for the coolant jacket. Due to the coolant channels 46, 46 being an integral part of the stator assembly 26, heat energy can be transferred to the circulating coolant at a quicker rate compared to conventional electric machine modules with outside coolant jackets. More specifically, by allowing the liquid coolant to pass directly across the stator laminations 28, the thermal benefit is maximized since there is no additional thermal drop in conducting heat from the laminations 28 to a second or third body or frame (e.g., the steel sleeve or another housing member), which would be accompanied by thermal resistance. In addition, staggering the outer diameters of the stator laminations 28 can yield a higher surface area for the coolant to come in contact with, compared to a stator assembly with a smooth outer diameter. In some embodiments, each stator lamination 28 can have a thickness of about 0.35 millimeters. Further, exhausting the coolant over the stator end turns 30 can yield additional cooling prior to recycling the coolant through the heat exchanger.

The coolant channels 40, 46 can be more easily formed and implemented, and thus, cheaper compared to coolant jackets formed by outer housings because fewer materials and manufacturing processes are required for the housing 12. Additionally, in some embodiments, due to the housing 12 not requiring an outer coolant jacket, the total weight of the electric machine module 10 can be reduced compared to electric machine modules with bulkier outer housings containing coolant jackets. Also, the elimination of an outer coolant jacket can substantially reduce an outer diameter of the electric machine module 10. Typically, the steel sleeve/other housing member can added about 8 millimeters to about 10 millimeters to the outer diameter of an electric machine module.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. Various features and advantages of the invention are set forth in the following claims.

The invention claimed is:

1. An electric machine module comprising:
a machine cavity;
an electric machine including a stator assembly, the stator assembly including a first set of stator laminations and a second set of stator laminations,
the first set of stator laminations including a portion having a first outer diameter,
the second set of stator laminations including a portion having a second outer diameter larger than the first outer diameter,
at least some of the second set of stator laminations each including first radial portions having a first radius and second radial portions having a second radius smaller than the first radius, the first radial portions and the second radial portions being staggered between one another;
at least one circumferential coolant channel defined substantially around a circumference of the stator assembly by the first set of stator laminations and the second set of stator laminations; and
at least one axial coolant channel defined substantially along an axial length of the stator assembly by the first set of stator laminations and the second set of stator laminations;
a third set of stator laminations positioned at axial ends of the stator assembly, the third set of stator laminations including the first radial portions with the first radius along a lower portion of the stator assembly so that fluid communication between the plurality of axial coolant channels and the machine cavity is substantially prevented along the lower portion.

2. The electric machine module of claim 1, wherein the first set of stator laminations and the second set of stator laminations are positioned relative to one another to form radially extending fins substantially around the circumference of the stator assembly.

3. The electric machine module of claim 2, wherein the first radial portions and the second radial portions are staggered around a circumference of the second set of stator laminations to form a plurality of axial slots.

4. The electric machine module of claim 3, wherein the at least one circumferential coolant channel comprises a plurality of circumferential coolant channels at least partially defined between the plurality of radially-extending fins.

5. The electric machine module of claim 4, wherein the at least one axial coolant channel comprises a plurality of axial coolant channels at least partially defined through the axial slots and along an outer surface of the first set of stator laminations.

6. The electric machine module of claim 5, and further comprising a housing substantially circumscribing the electric machine, the housing comprising a sleeve member and at least one end cap coupled to the sleeve member, the sleeve member and the at least one end cap at least partially defining a machine cavity, wherein the electric machine is positioned inside the housing relative to the sleeve member so that the first radial portions contact the sleeve member, and the plurality of axial coolant channels and the plurality of circumferential coolant channels are at least partially defined by the sleeve member.

7. The electric machine module of claim 6 wherein the third set of stator laminations including the first radial portions with the first radius and the second radial portions with the second radius staggered between the first radial portions along an upper portion of the stator assembly so that the axial coolant channels are in fluid communication with the machine cavity along the upper portion.

8. The electric machine module of claim 7, wherein the sleeve member further comprises at least one inlet port in fluid communication with the plurality of axial coolant channels and the plurality of circumferential coolant channels.

9. The electric machine module of claim 8, wherein a coolant is capable of being dispersed from the at least one inlet port, substantially through the plurality of axial coolant channels and the plurality of circumferential coolant channels, into the machine cavity through the plurality of axial coolant channels along the upper portion of the stator assembly.

10. An electric machine module comprising:
an electric machine including a stator assembly, the stator assembly including a plurality of stator laminations;
the plurality of stator laminations including a plurality of different outer diameters, and a portion of the plurality of stator laminations each including at least two different radii;
at least one circumferential coolant channel and at least one axial coolant channel defined by the plurality of stator laminations,
the at least one circumferential coolant channel defined substantially around a circumference of the stator assembly, and
the at least one axial coolant channel defined substantially along an axial length of the stator assembly;
a housing including an inner wall, a sleeve member and at least one end cap coupled to the sleeve member, the housing substantially circumscribing the electric machine, and the sleeve member and the at least one end cap at least partially defining a machine cavity;
and wherein the plurality of different outer diameters includes a first outer diameter and a second outer diameter larger than the first outer diameter, wherein the plurality of stator laminations includes a first set of stator laminations comprising the first outer diameter and a second set of stator laminations comprising a second outer diameter; and the first set of stator laminations and the second set of stator laminations are positioned relative to one another to form a plurality of radially extending fins around the circumference of the stator assembly;
and wherein the portion of the plurality of stator laminations each including at the least two different radii includes the second set of stator laminations; the at least two different radii include a first radius and a second radius smaller than the first radius; the second set of stator laminations comprises first radial portions including the first radius, and second radial portions including the second radius staggered between the first radial portions to form a plurality of axial slots; and wherein the first outer diameter of the first set of stator laminations is substantially equal to double the second radius;
a third set of stator laminations positioned at axial ends of the stator assembly, the third set of stator laminations comprise the first radial portions along the first portion of the stator assembly so that fluid communication between the axial coolant channels and the machine cavity is substantially prevented along the first portion; and
the third set of stator laminations comprise the first radial portions and the second radial portions staggered between the first radial portions along the second portion of the stator assembly to form secondary axial slots which provide fluid communication between the axial coolant channels and the machine cavity along the second portion.

11. The electric machine module of claim 10, wherein the at least one circumferential coolant channel comprises a plurality of circumferential coolant channels at least partially defined between the plurality of radially extending fins.

12. The electric machine module of claim 11, wherein the at least one axial coolant channel comprises a plurality of axial coolant channels at least partially defined through the axial slots and along an outer surface of the first set of stator laminations.

13. The electric machine module of claim 12, wherein the plurality of axial coolant channels and the plurality of circumferential coolant channels are at least partially defined by the inner wall of the housing.

14. The electric machine module of claim 13, wherein the sleeve member further comprises at least one inlet port in fluid communication with the plurality of axial coolant channels and the plurality of circumferential coolant channels.

15. The electric machine module of claim 14, wherein a coolant is capable of being dispersed from the at least one inlet port, substantially through the plurality of axial coolant channels and the plurality of circumferential coolant channels, and into the machine cavity through the axial coolant channels along the second portion of the stator assembly.

16. A method for cooling an electric machine module, the method comprising:
providing an electric machine including a stator assembly, the stator assembly including a plurality of stator laminations, the plurality of stator laminations including a plurality of different outer diameters, and a portion of the plurality of stator laminations including at least two different radii;
positioning the plurality of stator laminations relative to each other to form at least one circumferential coolant channel substantially around a circumference of the stator assembly and at least one axial coolant channel substantially along an axial length of the stator assembly;
providing a housing substantially circumscribing the electric machine, the housing including an inner wall, a sleeve member and at least one end cap coupled to the sleeve member, the housing substantially circumscribing the electric machine, and the sleeve member and the at least one end cap at least partially defining a machine cavity; and an inlet port in fluid communication with the at least one circumferential coolant channel and the at least one axial coolant channel;
providing a third set of stator laminations positioned at axial ends of the stator assembly, the third set of stator laminations comprise the first radial portions along the first portion of the stator assembly so that fluid communication between the axial coolant channels and the machine cavity is substantially prevented along the first portion,
the third set of stator laminations comprise the first radial portions and the second radial portions staggered between the first radial portions along the second portion of the stator assembly to form secondary axial slots which provide fluid communication between the axial coolant channels and the machine cavity along the second portion;
introducing a coolant through the inlet port; and
circulating the coolant through the at least one circumferential coolant channel and the at least one axial coolant channel to cool the electric machine.

17. The method for cooling an electric machine module of claim 16, and further comprising collecting the circulated coolant near a drain adjacent to a bottom portion of the housing.

* * * * *